(12) United States Patent
Horsnell et al.

(10) Patent No.: US 10,922,084 B2
(45) Date of Patent: Feb. 16, 2021

(54) HANDLING OF INTER-ELEMENT ADDRESS HAZARDS FOR VECTOR INSTRUCTIONS

(71) Applicant: ARM LIMITED, Cambridge (GB)

(72) Inventors: Matthew James Horsnell, Cambridge (GB); Mbou Eyole, Soham (GB)

(73) Assignee: ARM Limited, Cambridge (GB)

( * ) Notice: Subject to any disclaimer, the term of this patent is extended or adjusted under 35 U.S.C. 154(b) by 28 days.

(21) Appl. No.: 16/331,179

(22) PCT Filed: Aug. 14, 2017

(86) PCT No.: PCT/GB2017/052387
§ 371 (c)(1),
(2) Date: Mar. 7, 2019

(87) PCT Pub. No.: WO2018/055326
PCT Pub. Date: Mar. 29, 2018

(65) Prior Publication Data
US 2019/0258489 A1 Aug. 22, 2019

(30) Foreign Application Priority Data
Sep. 20, 2016 (GB) .................................. 1615959.2

(51) Int. Cl.
*G06F 9/30* (2018.01)
*G06F 9/38* (2018.01)
*G06F 9/54* (2006.01)

(52) U.S. Cl.
CPC ........ *G06F 9/3842* (2013.01); *G06F 9/30036* (2013.01); *G06F 9/30043* (2013.01);
(Continued)

(58) Field of Classification Search
None
See application file for complete search history.

(56) References Cited

U.S. PATENT DOCUMENTS 10,437,594 B2 * 10/2019 Eyole ................... G06F 15/8076
2005/0188178 A1 * 8/2005 Saida .................... G06F 9/3834
712/2

(Continued)

FOREIGN PATENT DOCUMENTS

WO 2016/105789 6/2016

OTHER PUBLICATIONS

International Search Report and Written Opinion of the ISA for PCT/GB2017/052387, dated Nov. 16, 2017, 10 pages.
(Continued)

*Primary Examiner* — Hyun Nam
(74) *Attorney, Agent, or Firm* — Nixon & Vanderhye P.C.

(57) ABSTRACT

An apparatus has processing circuitry supporting vector load and store instructions. In response to a transaction start event, the processing circuitry executes one or more subsequent instructions speculatively. In response to a transaction end event, the processing circuitry commits speculative results of those instructions. Hazard detection circuitry detects whether an inter-element address hazard occurs between an address for data element J for an earlier vector load instruction and an address for data element K for a later vector store instruction, where K and J are not equal. In response to detecting the inter-element address hazard, the hazard detection circuitry triggers the processing circuitry to abort further processing of the instructions following the transaction start event and to prevent the speculative results being committed. This approach can provide faster performance for vectorised code.

19 Claims, 7 Drawing Sheets

(52) U.S. Cl.
CPC .......... *G06F 9/3834* (2013.01); *G06F 9/3838* (2013.01); *G06F 9/542* (2013.01)

(56) References Cited

U.S. PATENT DOCUMENTS

| | | | |
|---|---|---|---|
| 2010/0042789 A1* | 2/2010 | Gonion ............... | G06F 9/30072 711/154 |
| 2010/0332806 A1* | 12/2010 | Golla .................... | G06F 9/3851 712/216 |
| 2013/0080737 A1* | 3/2013 | Reid ........................ | G06F 8/452 712/4 |
| 2015/0100754 A1* | 4/2015 | Reid .................... | G06F 9/3842 712/6 |
| 2015/0268940 A1* | 9/2015 | Baghsorkhi ............. | G06F 8/452 717/160 |
| 2016/0188329 A1 | 6/2016 | Ould-Ahmed-Vall et al. | |
| 2019/0258489 A1* | 8/2019 | Horsnell ............... | G06F 9/3834 |

OTHER PUBLICATIONS

Search and Examination Report for GB1615959.2, dated Mar. 27, 2017, 7 pages.
Communication under Rule 71(3) EPC Intention to grant for EP Application No. 17752474.1 dated Dec. 1, 2020, 7 pages.

\* cited by examiner

| tag | coherency state | (TM state) | alias | data |
|---|---|---|---|---|
| | | | 2 | |
| | | | 0 | |
| | | | 0 | |
| | | | 3 | |
| | | | 0 | |

| min | max |
|---|---|
| # a + 40 | # a + 64 |
| | |
| | |
| ⋮ | ⋮ |

| add 3 | add 2 | add 1 | add 0 |
|---|---|---|---|
| | | | |
| # a + 88 | # a + 64 | # a + 48 | # a + 16 |
| | | | |
| ⋮ | ⋮ | ⋮ | ⋮ |

HANDLING OF INTER-ELEMENT ADDRESS HAZARDS FOR VECTOR INSTRUCTIONS

This application is the U.S. national phase of International Application No. PCT/GB2017/052387 filed 14 Aug. 2017, which designated the U.S. and claims priority to GB Patent Application No. 1615959.2 filed 20 Sep. 2016, the entire contents of each of which are hereby incorporated by reference.

The present technique relates to the field of data processing.

Some data processing systems support processing of vector instructions for which a source operand or result value of the instruction is a vector comprising multiple data elements. By supporting the processing of a number of distinct data elements in response to a single instruction, code density can be improved and the overhead of fetching and decoding of instructions reduced. An array of data values to be processed can be processed more efficiently by loading the data values into respective elements of a vector operand and processing the data values several elements at a time using a single vector instruction.

At least some examples provide an apparatus comprising:
processing circuitry to perform data processing in response to instructions, wherein in response to a vector load instruction, the processing circuitry is configured to load respective data elements of a vector value with data from respective locations of a data store, and in response to a vector store instruction, the processing circuitry is configured to store data from respective data elements of a vector value to respective locations of the data store;
wherein the processing circuitry is responsive to a transaction start event to speculatively execute one or more subsequent instructions, and responsive to a transaction end event to commit speculative results of the one or more subsequent instructions speculatively executed following the transaction start event;
the apparatus comprises hazard detection circuitry to detect whether an inter-element address hazard occurs between an address corresponding to data element J for an earlier vector load instruction speculatively executed following the transaction start event and an address corresponding to data element K for a later vector store instruction speculatively executed following the transaction start event, where K is different to J, and both the earlier vector load instruction and the later vector store instruction are from the same thread of instructions processed by the processing circuitry;
wherein in response to detecting the inter-element address hazard, the hazard detection circuitry is configured to trigger the processing circuitry to abort further processing of the instructions subsequent to the transaction start event and prevent said speculative results being committed.

At least some examples provide an apparatus comprising:
means for processing data in response to instructions, wherein in response to a vector load instruction, the means for processing is configured to load respective data elements of a vector value with data from respective locations of a data store, and in response to a vector store instruction, the means for processing is configured to store data from respective data elements of a vector value to respective locations of the data store;
wherein the means for processing is responsive to a transaction start event to speculatively execute one or more subsequent instructions, and responsive to a transaction end event to commit speculative results of the one or more subsequent instructions speculatively executed following the transaction start event;
the apparatus comprises means for detecting an inter-element address hazard between an address corresponding to data element J for an earlier vector load instruction speculatively executed following the transaction start event and an address corresponding to data element K for a later vector store instruction speculatively executed following the transaction start event, where K is different to J, and both the earlier vector load instruction and the later vector store instruction are from the same thread of instructions processed by the processing circuitry; and
in response to detecting the inter-element address hazard, the means for detecting is configured to trigger the means for processing to abort further processing of the instructions subsequent to the transaction start event and prevent said speculative results being committed.

At least some examples provide a data processing method comprising:
in response to a transaction start event, speculatively executing one or more subsequent instructions;
in response to a vector load instruction, loading respective data elements of a vector value with data from respective locations of a data store;
in response to a vector store instruction for storing data from respective data elements of a vector value to respective locations of the data store, detecting whether an inter-element address hazard occurs between an address corresponding to data element J for the vector load instruction and an address corresponding to data element K for the store instruction, where K is different to J, and both the earlier vector load instruction and the later vector store instruction are from the same thread of instructions;
in response to detecting the inter-element address hazard, aborting further processing of the one or more subsequent instructions and preventing speculative results of the one or more subsequent instructions being committed; and
in response to a transaction end event, committing the speculative results of the one or more subsequent instructions.

Further aspects, features and advantages of the present technique will be apparent from the following description of examples, which is to be read in conjunction with the accompanying drawings, in which.

An apparatus may have processing circuitry which supports processing of vector instructions. One example of a vector instruction is a vector load instruction, in response to which respective data elements of a vector value are loaded with data from respective locations of a data store. Another example is a vector store instruction, in response to which the processing circuitry may store data from respective data elements of the vector value to respective locations of the data store. For example, the vector value used for the vector load/store instruction may be stored in a register.

The processing circuitry is responsive to a transaction start event to speculatively execute one or more subsequent instructions, and responsive to a transaction end event to commit speculative results of those one or more subsequent instructions which were speculatively executed following the transaction start event. Hazard detection circuitry is provided to detect whether an inter-element address hazard occurs between an address corresponding to data element J for an earlier vector load instruction speculatively executed following a transaction start event and an address corresponding to data element K for a later vector store instruction also speculatively executed following the transaction start event. K and J are integer values which are not equal to each other. Both the earlier vector load instruction and the later vector store instruction are from the same thread of instructions processed by the processing circuitry. In response to detecting the inter-element address hazard, the hazard detection circuitry may trigger the processing circuitry to abort further processing of the instructions subsequent to the transaction start event and prevent the speculative results being committed.

It may not be immediately apparent that there is a need for hazard detection circuitry to detect address hazards between later and earlier instructions within the same thread of instructions being processed. One would normally expect such instructions to be acting sequentially and so would not need mechanisms such as hazard detection or transaction handling which would typically be used for parallel accesses to data by different threads of program execution. However, in an apparatus supporting vector processing, a common use for the vector instructions is to vectorise a number of iterations of a program loop written in scalar code, with multiple iterations of the loop mapped to respective lanes of vector processing for a sequence of vector instructions. Hence, a vector load instruction may load the inputs to be processed by a number of consecutive iterations of the loop into respective elements of a vector value, one or more vector instructions may then process each of those elements in respective lanes of processing, and then a vector store instruction may store each lane's result to a respective location in the data store. This enables performance to be improved and the overhead of instruction caching, fetching and decoding to be reduced in comparison to executing each iteration separately using scalar instructions.

However, it is possible that there may be inter-dependencies between different iterations of the scalar loop, in which for example an earlier iteration may write a value to the data store which is used as an input to a later iteration. If such iterations to the loop are mapped to different lanes of the same sequence of vector instructions, it is possible that some of the results may be incorrect because a lane corresponding to a later iteration of the loop being vectorised may load a value which has not yet been updated by a lane corresponding to an earlier iteration. While some hazards can be identified statically at compile time, this cannot protect against all potential hazards, as some load/store addresses depend on other values read from the data store, so whether a hazard occurs or not may vary dynamically at runtime.

One approach for protecting against dynamic hazards could be to provide additional code before the vector sequence to check the addresses used by loads/stores in the respective lanes, to prevent the code being vectorised if there are address hazards. However, such checks are slow, and incurring the penalty of those checks on every iteration of a vectorised loop can be harmful to performance. Another approach can be for a compiler to conservatively assume that, as there could be a hazard between the load/store addresses in different lanes, the scalar loop should not be vectorised, and should instead be processed with each iteration of the loop in the original program code performed sequentially using scalar instructions. However, in practice, inter-element address hazards are relatively rare and so this approach risks throwing away any potential performance benefits which can be achieved through vectorisation in the large majority of cases because a small minority of cases may not generate the correct results.

These issues can be addressed by allowing the processing circuitry to start executing a sequence of instructions speculatively following a transaction start event, and for the speculative results of the executed instructions to be committed subsequently following a transaction end event. Hazard detection circuitry can be provided to detect inter-element address hazards occurring between the transaction start event and transaction end event, and to trigger abortion of further processing of the instructions subsequent to the transaction start event, if a hazard is detected before the transaction end event is reached, so that the speculative results are prevented from being committed. With this approach, the hazard checking does not delay the code itself from proceeding in the cases when there are no address hazards, as the speculatively executed results can be discarded in the event of a hazard, and so it is safe to proceed with executing the instructions assuming there are no hazards. Also, as there is hardware support for detecting static or dynamic hazards which do arise, the compiler does not need to conservatively assume the worst case scenario and so can allow vectorisation of scalar loops even if there is a potential for inter-dependencies between iterations of the loop. Hence, performance can be improved.

When the inter-element address hazard is detected, the hazard detection circuitry may also trigger the processing circuitry to restore architectural state data to a previous version of the architectural state data captured in response to the transaction start event. For example, changes to data values in registers which have occurred in the processing of the instructions following the transaction start event may be rolled back to an earlier state captured at the time of the transaction start event. Meanwhile, results of any speculatively performed load/store operations may also be wound back. For example, write data associated with store instructions may be buffered within a cache or memory of the data store. These buffered data values may be discarded, invalidated or overwritten when an inter-element address hazard is detected, or committed to state once the transaction end event is reached.

In general, the hazard detection circuitry may detect inter-element address hazards between data element J of the earlier vector load instruction and data element K of the later store instruction where K is different to J. In some cases the hazard checking may check for any address hazard between any pair of different data element positions for the load and store respectively. The data elements at different positions within the vector in the respective load and store instructions will typically correspond to different iterations of the scalar loop being vectorised, and so by checking for cross-element hazards, cases where one iteration is relying on a value set by another iteration of the loop can be detected.

However, in practice most compilers typically vectorise scalar code by filling up the vectors from the lowest element of the vector to the highest element in sequence, with the earliest iterations of the scalar loop being allocated to the lowest-numbered element of the vector (element 0) and the latest iteration of the loop being allocated to the highest-numbered element of the vector (element N−1, where N is the number of elements in the vector). In fact, some vector architectures may require the compiler to fill up the vector starting from the bottom element. As it is generally not a problem for a later iteration of the scalar loop to set a value which was already read by an earlier iteration of the scalar loop, then in some cases the hazard detection circuitry may restrict its hazard detection to detecting hazards where K<J (where the hazarding addresses correspond to a higher element J of an earlier vector load instruction and a lower element K of the later vector store instruction). This approach can simplify hazard tracking in many cases, as it reduces the number of pairs of elements for which addresses are to be compared. Also, restricting hazard detection to cases where K<J can also improve performance because it is less likely that a transaction is aborted. Nevertheless, some systems may still detect hazards between addresses used for any pair of differently positioned elements of the load and store, if this is considered more appropriate (e.g. if the compiler has freedom to map loop iterations to vector lanes in a different manner to the bottom-up approach described above).

A programmer or compiler can use the transaction start event and transaction end event to identify sequences of instructions at risk of inter-element address hazards. The transaction start event and transaction end event could be dedicated transaction start and end instructions supported by the processing circuitry. For example the transaction start instruction and transaction end instruction may be native program instructions supported by an instruction decoder which decodes instructions to be processed by the processing circuitry. In response to a transaction start instruction, the processing circuitry may perform operations for preparing the processing circuitry for speculative processing of the subsequent instructions, such as capturing the architectural state as discussed above. In response to the transaction end instruction, the speculative results can be committed and any previously captured version of architectural state can be discarded. Hence, the programmer/compiler can identify the instructions to be treated as a transaction by bounding them with the transaction start/end instructions.

Alternatively, rather than providing native instructions for signalling the transaction start event and transaction end event, other mechanisms could be used. For example, the transaction start event could be signalled by using a general purpose instruction to set a control bit in a control register to mark the start of a transaction, and the end event can be implemented in a similar manner by updating a control register to signal the end of the transaction.

Hazard tracking storage circuitry may be provided to store hazard tracking data for tracking addresses used for one or more earlier vector load instructions speculatively executed following the transaction start event. This can then be used by the hazard detection circuitry to detect when a later vector store instruction is encountered whether there is an inter-element address hazard.

In some cases the hazard tracking storage circuitry may comprise part of the data store itself (in which data is accessed in response to the vector load or store instructions). For example, the hazard tracking data could be stored in a cache, along with the data itself. Alternatively, the hazard tracking storage circuitry could include part of a data structure used for managing load or store requests to be handled by the data store, such as a load/store queue for queuing load or store instructions issued by the processing circuitry, or a store buffer for storing data values to be written to memory. Alternatively, the hazard tracking storage circuitry could be entirely separate from the circuitry provided for managing load or store requests, e.g. a dedicated structure maintained by the hazard detection circuitry.

The hazard detection circuitry may clear the hazard tracking data in response to the transaction start event. This may prevent the hazard detection circuitry detecting hazards when the new transaction accesses an address which is the same as another address previously accessed by an earlier transaction. Alternatively, the hazard tracking data could be cleared in response to the transaction end event, so that the hazard tracking data will be initialised upon starting a new transaction.

The hazard detection circuitry may also clear the hazard tracking data in response to a transaction clear event occurring following the transaction start event (but before the transaction end event). For example, the transaction clear event could be triggered by a transaction clearing instruction (which may be a native instruction supported by the instruction decoder). Providing a dedicated transaction clearing instruction to clear the hazard tracking data can be particularly useful for allowing multiple iterations of the vectorised loop to execute within one transaction. The actions to be performed in response to the transaction start event or the transaction end event may incur a performance overhead. For example, in response to the transaction start event, architectural state may need to be saved, while at the transaction end the speculative results may need to be committed. If a scalar loop is vectorised using vectors of N elements each, then while the vectorisation may introduce hazards within lanes of one vector corresponding to a block of N consecutive iterations of the loop, the vectorisation does not introduce hazards between iterations more than N iterations apart, as iteration N+1 for example would in any case be performed after all the previous N iterations have completed. Therefore, it may be desirable to clear the hazard tracking data when N iterations have been processed, to avoid unnecessary aborts. However, executing each block of N iterations of the loop as a separate transaction may incur the transaction entry/exit overhead each time N iterations are complete. This overhead can be reduced by providing a transaction clear instruction which signals that the hazard tracking data can be cleared without actually ending the transaction itself. In this way, the transaction clear instruction can be executed each time a block of N iterations to the loop have been processed in a vector code sequence, and more than N iterations of the loop can be processed within a single transaction while being protected against hazards.

In general, the hazard detection circuitry may update the hazard tracking data based on addresses used for vector load instructions which are speculatively executed following a transaction start event. The hazard detection circuitry can then compare the hazard tracking data with the addresses used by subsequent vector store instructions to detect whether an inter-element address hazard has arisen.

In some cases, the hazard detection circuitry may not update the hazard tracking data in response to all vector load instructions, but may restrict the updates to a predetermined type of vector load instruction, with the update of the hazard tracking data being suppressed in response to vector load instructions other than the predetermined type (updates to the tracking data may also be suppressed in response to scalar load instructions). For example, the predetermined type of vector load instruction could be distinguished from other types of vector load instructions by its opcode, by a flag within the instruction encoding, or by an implicit indication which is independent of the encoding of the vector load instruction, such as a hint instruction placed in front of the vector load instruction within the vector code which signals that the subsequent vector load instruction will be of the type to be tracked using the hazard detection circuitry.

Often the programmer or the compiler may be aware that certain loads are not at risk of causing inter-element address hazards, e.g. because they use a statically determined address which is known to be different from the address of any subsequent store, or because there are no inter-dependencies between different iterations of the scalar loop to be vectorised. On the other hand, if there is a particular load for which there is a risk of conflict with a subsequent store then the predetermined type of vector load instruction can be used for that load. By restricting the updating of the hazard tracking data to a predetermined type of vector load instruction, this reduces the number of addresses to be tracked (which can make more efficient use of the tracking storage capacity available). Also, as will be discussed below, in some cases to reduce the hardware cost of address tracking, the address tracking may be relatively imprecise, e.g. it may track load/store accesses at the granularity of blocks of addresses rather than individual addresses. This means that detecting hazards for all types of load may risk more frequent aborts caused by false positive hazards detected where a load and store access the same block of addresses but do not actually access the same address. By restricting the hazard detection to the predetermined type of load, transactions are not aborted unnecessarily due to false positive hazards for other types of load for which the programmer/compiler already indicated (by choosing not to use the predetermined type of load) that hazards would not occur.

There are several ways of implementing the hazard tracking data. In one example, the hazard tracking data may comprise a number of tracking entries which each correspond to a respective block of address and identify the highest data element position at which an address within that block of addresses was used for an earlier vector load instruction speculatively executed following the transaction start event. In this context the highest data element position refers to the position closest to the most significant end of the vector operand. The hazard detection circuitry may then detect the inter-element address hazard for the later vector store instruction when the tracking entry corresponding to a block of addresses including an address used for a given data element position for the later vector store instruction identifies a higher data element position than the given data element position (this is an example of an approach which restricts inter-element hazard detection to cases where K<J as mentioned above). In summary, by tracking the highest element which has accessed a given block of addresses, and signalling a hazard when a subsequent store attempts to access that block of addresses from a lower data element position, this can detect cases when a later iteration of the loop has accessed a value out of turn before an earlier iteration of the loop has updated the value (write after read hazards), and trigger the transaction to be aborted in that case.

With this approach to hazard tracking, one option is to store the track entries within the cache alongside the data itself. That is, the data store may comprise a cache including a number of cache lines for storing data, and the tracking entries may be stored in the cache with each cache line being associated with one or more of the track entries for one or more blocks of address corresponding to that cache line.

The granularity at which the track entries track accesses to blocks of addresses may vary. In some cases each cache line may comprise a single track entry, and so if a later store accesses the same cache line as an earlier load from a lower element position than the load, a hazard may be detected (even if the store actually accesses a different address within the same cache line as the earlier load). Other implementations may track accesses at a more fine grained level and may provide multiple tracking entries per cache line for tracking accesses to different portions of the cache line, to provide more precise detection of hazards. Hence, it will be appreciated that a detected hazard does not necessarily mean that the load/store would actually have accessed the same address—it may be that the hazard detection circuitry may simply have detected a risk of a conflicting access based on the imprecise tracking data. There is a trade off between the hardware cost and performance benefits of more/less precise hazard tracking.

When the cache is used to store the tracking entries for tracking the addresses accessed by previous loads, it is possible that a given cache line may be evicted from the cache when other data needs to be stored in the cache. At this point, the corresponding tracking entry would also be evicted, so that the information on the previous load addresses could be lost. Therefore, on eviction of a cache line having a tracking entry which indicates that at least one address within the corresponding block of addresses was used for an earlier vector load instruction since the transaction start event, the hazard detection circuitry may trigger the processing circuitry to abort further processing of the instructions following the transaction start event and prevent the speculative results being committed, in a similar manner to if a hazard was actually detected. In practice, the transactions may be relatively short and so the chance of data previously accessed by a load instruction being evicted before the end of the transaction (or a clear instruction) is reached may be relatively low, but by providing the ability to abort transactions in that rare case, this guards against hazards being missed because the tracking data is no longer in the cache, and may be more efficient than more complex alternatives where the evicted tracking information is retained in memory or another structure.

In another example, the hazard tracking data may comprise one or more load tracking entries which each identify at least one of a minimum address and a maximum address accessed for a corresponding vector load instruction which was speculatively executed from one of the transactions start event. This approach can be useful for a contiguous vector load or store instructions where the least significant element of the vector uses a given address for the load/store operation, and subsequent elements of the vector use successive addresses which follow consecutively from the address used for the least significant element of the vector. For such instructions identifying at least one of the minimum address and the maximum address used for a given load instruction can be enough to be able to determine whether a subsequent store will access a corresponding address at a different element position. For example the hazard detection circuitry may detect an inter-element address hazard when a minimum address for a later vector store instruction is greater than the minimum address, and less than or equal to the maximum address, indicated by one of the load tracking entries. In some cases it may not be necessary to identify both the minimum and maximum addresses, for example if all vector instructions use a fixed number of elements then the maximum address might be implicit from the minimum address, or vice versa. Also, in some cases one of the minimum and maximum address could be identified through an offset or as a total number of elements of the vector, rather than as an explicit address, which still allows the actual maximum or minimum address to be identified.

Another approach to tracking hazards may be to provide an address list which identifies one or more addresses accessed for respective data elements of one or more vector load instructions speculatively executed following the transaction start event. For example, the address list may identify a correspondence between the addresses accessed and the element positions at which those addresses were accessed. The hazard detection circuitry may then detect the inter-element address hazard when an address corresponding to a given data element position for the later vector store instruction is the same as a vector address corresponding to a data element position other than that given data element position for an earlier vector load instruction speculatively executed following the transaction start event. This approach can be particularly useful for a non-contiguous load or store instruction where the addresses used by each element of the vector operation are derived from another vector input which may specify non-consecutive addresses or address offsets to be used for each of the elements. In this case, the address for later elements of the vector cannot be determined from the earlier elements and so instead each of the addresses accessed may be tracked. Nevertheless, this approach could also be used for contiguous type load store instructions. For example if non-contiguous instructions are supported then it may be more efficient to use a common tracking format for both types of load/store instruction.

Figure 1:
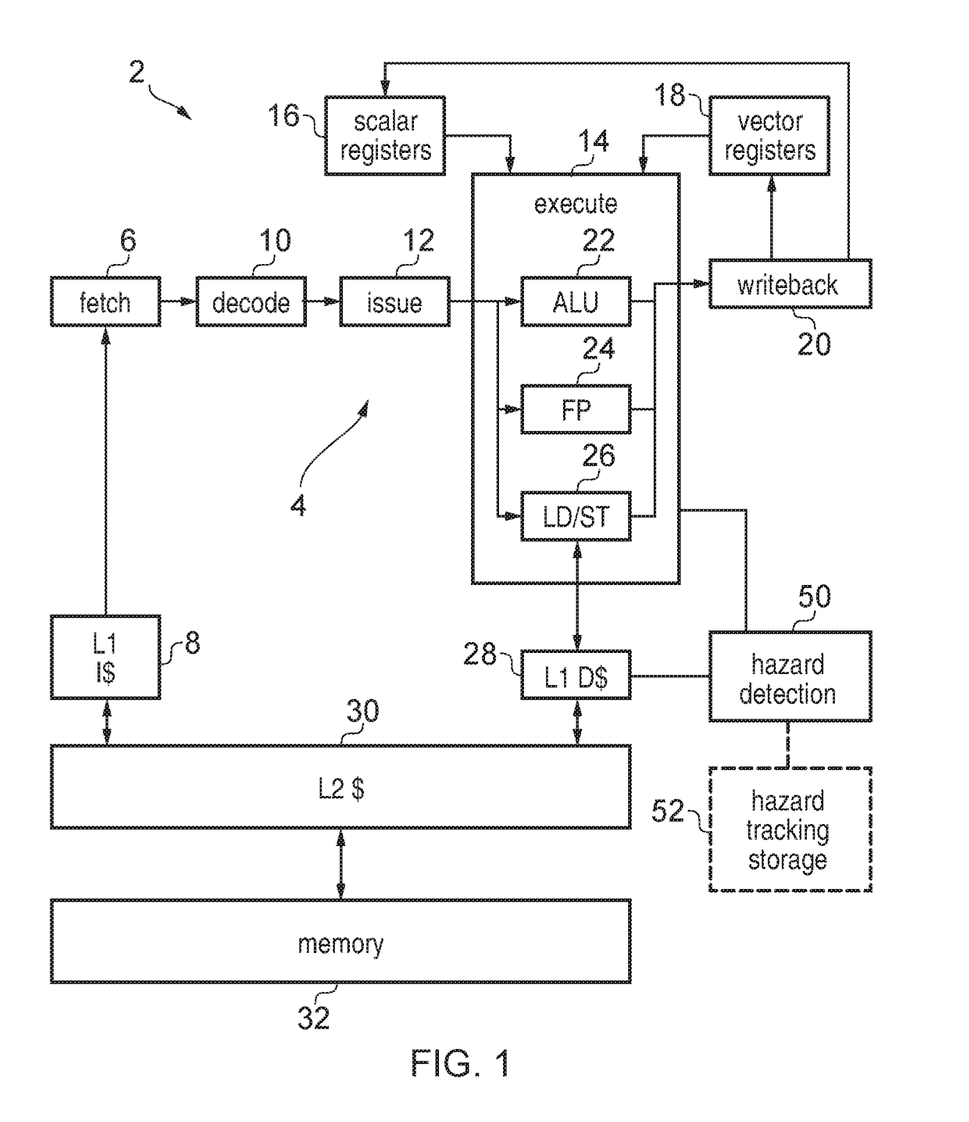
FIG. 1 schematically illustrates an example of a data processing apparatus supporting processing of vector instructions.

FIG. 1 schematically illustrates an example of a data processing apparatus 2 supporting vector processing. The apparatus 2 has processing circuitry 4, such as a processor, CPU (central processing unit) or GPU (graphics processing unit) for example, which performs data processing operations in response to instructions. The processing circuitry 4 includes a processing pipeline which includes a number of pipeline stages including for example a fetch stage 6 for fetching instructions to be executed from an instruction cache 8, a decode stage 10 for decoding the fetched instructions to generate control signals for controlling the subsequent stages to perform the appropriate processing operations, an issue stage 12 for queuing decoded instructions awaiting execution until their required operands become available at which point they are issued for an execution, an execute stage 14 for executing the issued instructions to perform the corresponding processing operations using operands read from registers 16, 18, and a writeback stage 20 for writing the results of the executed instructions back to the registers 16, 18. The execute stage 14 includes a number of execution units for executing different types of instructions, such as an arithmetic/logic unit (ALU) 22 for performing arithmetic or logical operations, a floating point unit 24 for performing floating point operations and a load/store unit 26 for performing load or store operations. It will be appreciated that other types of processing units could be provided and this is just one example. While this example has a particular combination of pipeline stages, other examples could have additional stages. For example, in an out-of-order processor, a register rename stage could be provided between the decode and issue stages 10, 12 for remapping architectural register specifiers specified by instructions to physical register specifiers identifying the registers 16, 18 provided in hardware, and additional resources such as a reorder buffer may be provided for tracking the completion of instructions executed in a different order to the program order in which they were fetched from the cache 8 by the fetch stage 6.

The pipeline 4 supports processing of scalar instructions, which perform operations on scalar operands each comprising a single data value, and vector instructions, which involve processing of a vector value comprising a number of independent data elements stored within a single register, or which generate a vector value. Separate scalar registers 16 and vector registers 18 may be provided for storing the scalar values and vector values respectively. Some instructions may be mixed instructions which involve processing of both a scalar operand and a vector operand, while other instructions may process solely vector or solely scalar operands. While for conciseness this is not shown in FIG. 1, in some cases the execute stage 14 may include separate execution units for processing scalar and vector operations respectively, e.g. a separate scalar ALU and vector ALU. The vector execution unit may include the circuitry for performing each of the lanes of processing in response to a single instruction. In some cases a number of parallel execution units may be provided for performing multiple lanes of processing in parallel in response to a given vector instruction, to improve performance. Another approaches may be to perform the lanes of processing sequentially using a single set of execution units, or to provide sufficient execution units that a block of two or more lanes of the vector processing can be performed in parallel but the full vector may need several cycles through these execution units. Hence, vector processing does not imply that all of the lanes need to be processed in parallel. While parallel processing of vector lanes improves performance, there is still a benefit of vectorised processing compared to scalar code even if all lanes are processed sequentially, because of the reduced overhead in handling fewer instructions at the instruction cache 8, fetch stage 6, and decode stage 10.

One example of a vector operation may be a vector load instruction for loading data from a memory system to respective data elements of a vector, or a vector store instruction for storing data from respective data elements of a vector in one of the vector registers 18 to the memory system. In the example of FIG. 1 the memory system includes the level one instruction cache 8, a level one data cache 28, a shared level two cache 30 used for both data and instructions, and main memory 32. It will be appreciated that this is just one example of a possible memory hierarchy, and other configurations can be used.

Figure 2:
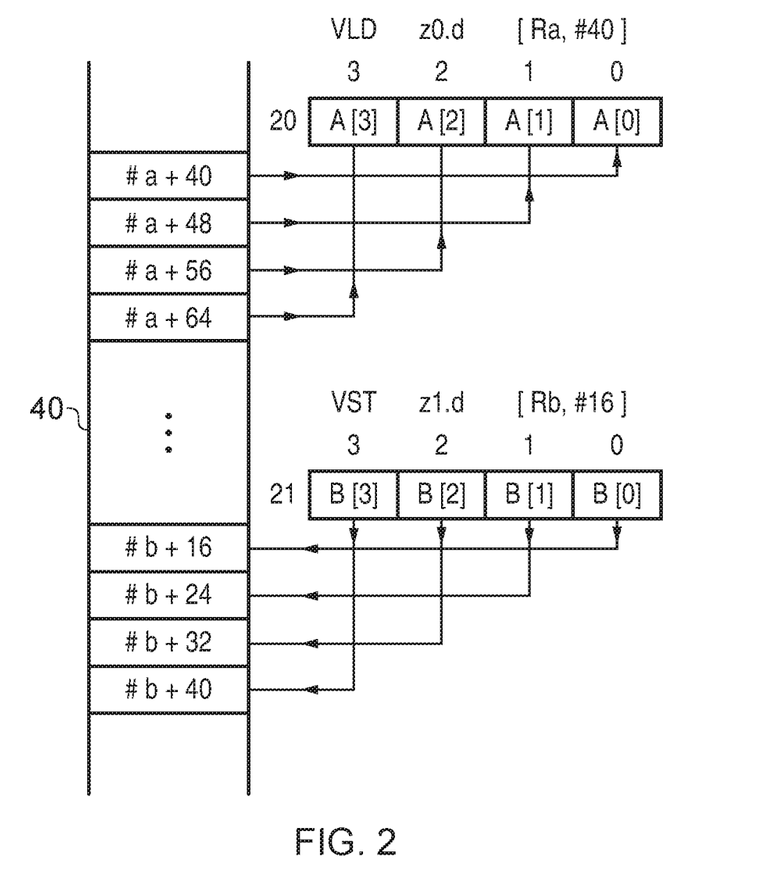
FIG. 2 schematically illustrates an example of a contiguous vector load instruction and a contiguous vector store instruction.

FIG. 2 schematically illustrates an example of a vector load instruction and a vector store instruction. As shown in the top part of FIG. 2, for a vector load instruction a number of processing lanes are performed with each processing lane loading a data value identified by a given address of a memory address space 40 from the data store to a corresponding data element of a target vector register Z0. This example shows a contiguous load instruction for which the address used for the least significant element A[0] of the target register is obtained by adding an offset #40 to a base register value Ra read from the scalar register file 16, and the addresses for the subsequent elements A[1] to A[3] follow consecutively after the address used by element A[0]. While this example shows a (base register+offset) addressing mode, other implementations may specify the offset using a further scalar register or use an immediate address.

For the store instruction shown at the bottom of FIG. 2, each lane of processing stores the data value read from the corresponding elements of the vector register Z1 to a location in the data store corresponding to the address calculated for that lane. Again, for the contiguous type store instruction the addresses are consecutive within the address space 40.

One way in which vector architectures improve performance is through loop vectorization. That is, multiple iterations of a loop $\{I_i, \ldots I_n\}$ are executed within multiple elements of a vector $\{e_i, \ldots e_n\}$. When and where this is possible the execution of the loop can be accelerated by up to a factor n (depending on the extent to which the micro-architectural implementation executes vector lanes in parallel).

There are a number of reasons why loops cannot be vectorised as described above. One is due to memory hazards. That is to say an iteration of the loop, say $I_i$ generates a new value that $I_{(i+m)}$ needs to consume. A simple example is shown below:

EXAMPLE 1

```
for i = 0; i < N; i++ {
    a[i+8] = a[i+5] + 4;
}
```

In scalar code, this loop may be implemented as follows:

EXAMPLE 2 scalar:
cycle 0 ldr x0, [a, #40]
cycle 1 add x0, x0, #4
cycle 2 str x0, [a, #64]
cycle 3 ldr x0, [a, #48]
cycle 4 add x0, x0, #4
cycle 5 str x0, [a, #72]
cycle 6 ldr x0, [a, #56]
cycle 7 add x0, x0, #4
cycle 8 str x0, [a, #80]
cycle 9 ldr x0, [a, #64]
cycle 10 add x0, x0, #4
cycle 11 str x0, [a, #88]

This may be vectorised to the following vector operations:

EXAMPLE 3

| | vector lane | | | |
|---|---|---|---|---|
| | 3 | 2 | 1 | 0 |
| cycle 0 | ldr x0, [a, #64] | ldr x0, [a, #56] | ldr x0, [a, #48] | ldr x0, [a, #40] |
| cycle 1 | add x0, x0, #4 | add x0, x0, #4 | add x0, x0, #4 | add x0, x0, #4 |
| cycle 2 | str x0, [a, #88] | str x0, [a, #80] | str x0, [a, #72] | str x0, [a, #64] |

The vector instruction syntax may look something like:

EXAMPLE 4 ld1d z0.d, [a, #40]
add z0.d, z0.d, #4
st1d z0.d, [a, #64]

(for simplicity, we ignore predication on loads and stores here).

This naïve approach does not maintain the semantics of the original scalar version because there is a hazard between iteration i and iteration i+3 (as shown by the operations shown in bold in Example 3). This leads to incorrect results, as the load from address [a, #64] in cycle 0 does not reflect the increment made in cycle 1 which is then stored in cycle 2.

In the above example, these dependencies can be determined statically. However, in the general case the addresses used for the load in cycle 0 and the store in cycle 2 could come from an indirection (another memory access), in which case the dependency can only be determined at run time. We refer to these as dynamic dependencies. In many cases, such dynamic dependencies are very rare, but unfortunately, in such cases, compilers tend to be conservative and do not vectorise the loop. This means that potential performance improvement is lost in the large majority of cases when there is no dependency.

Instead, the approach described herein assumes that, in general, there are no dependencies, and benefits from the performance gains from loop vectorization, but provides a mechanism to ensure that when such inter-element dependencies do occur, they are detected and resolved. An alternative approach to handling such dependencies would be to always test for dependencies by annotating potentially conflicting loads using explicit address comparison instructions. However, these operations incur a cost, and micro-architectural implementations of such instructions are slow.

Instead, we introduce the concept of a dependency transaction. Within a dependency transaction (DTX), we can safely vectorise the code, so long as we can roll back the architectural state if a dependency is detected and prevent any speculative updates being seen until we come to a safe commit point at the end of the transaction. By applying such a concept to the above example, the assembly code may look something like:

EXAMPLE 5

```
loop: thazard
      bne    scalarcode
      ld1d   z0.d, [a, #40]
      add    z0.d, z0.d, #4
      st1d   z0.d, [a, #64]
      tend
      subs   x0, x0, #1
      addvl  a, a, #1
      bne    <loop>
scalarcode:
      // scalar code version here
```

On executing a transaction start (thazard) instruction the hardware would take a checkpoint of the architectural state, or some portion thereof, and put the caches into a special transactional-alias mode. The caches can buffer speculative memory updates from potentially unsafe operations, within a structure (e.g. the level 1 private data cache). The speculation continues until a transaction end (tend) instruction is executed and the transaction successfully commits, or the transaction is self-aborted, or aborts due to a conflict.

For a dependency transaction (DTX), comprising the instructions executed speculatively between the transaction start instruction and the transaction end instruction, inter-element address hazards (also referred to as cross-element conflicts) are detected. A cross element conflict may be seen as a write-after-read hazard, where the read is from element i and the write is from element i-j (where j is positive). Such a hazard can be seen in the code of Example 3. The store in element 0 (cycle 3) has been read by an earlier load in element 3 (cycle 0). A conflict occurs in a dependency transaction if the lowest address accessed by any contiguous vector store instruction is less than or equal to the highest address accessed by a (preceding) contiguous vector load instruction and greater than the lowest address accessed by the vector load instruction.

Element tracking is provided for each normal or cacheable memory operation (or in some implementations, only for a restricted set of memory operations, such as loads of a predetermined type as discussed below). Each such memory operation may capture information specifying the element (vector lane) generating that operation. This element may be captured in a structure such that any subsequent memory operation can identify the maximum element touching the same address (or the same block of addresses if a more imprecise mapping is used) in the memory address space.

For example, elements could be tracked at 64-bit element granularity, and the maximum element accessing a given cache line is stored with the cache line in the L1 cache. That is, we capture one "maximal element" per cache line. The number of elements per vector is (VLb/64b), where VLb is the vector length, so in a 512-bit vector architecture we would track 8 distinct elements, and the tracking bits would comprise 3-bits per cache line:

EXAMPLE. 6 cache line—showing address tag, coherence state, TM state (state for tracking hazards for transactional memory purposes), and DTX alias state:

| addr-tag | state<4b> | tmstate<2b> | alias<3b> | data <64 bytes> |
|---|---|---|---|---|

Referring to Example 3 above, we update the cache line alias bits after each vector load instruction:

EXAMPLE 71

| <0-63> | — | — | alias 0 | data <64 bytes> |
|---|---|---|---|---|
| <64-127> | — | — | alias 0 | data <64 bytes> | ldid z0.d, [a, #40]
// cycle 0 ldr x0, [a, #64]|ldr x0, [a, 56]|ldr x0, [a, #48]|ldr x0, [a, #40]

| <0-63> | — | — | alias 2 | data <64 bytes> |
|---|---|---|---|---|
| <64-127> | — | — | alias 3 | data <64 bytes> |

// the maximum element that accesses addresses in the range #0-#63 is element 2, and the maximum element that accesses addresses in the range #64-127 is element 3.
add z0.d, z0.d, #4
// cycle 1 no changes to the cache line alias index as this is not a vector load operation.
st1d z0.d, [a, #64]
// cycle 2 str x0, [a, #88]|str x0, [a, #80]|str x0, [a, #72]|str x0, [a, #64]

| <0-63> | — | — | alias 2 | data <64 bytes> |
|---|---|---|---|---|
| <64-127> | — | — | alias 3 | data <64 bytes> |

// str @ #64 with element 0 cannot succeed as element 3 has accessed this cache line out of iteration order which means there has been a dependency hazard.

At the point of the store (cycle 3), it is clear that the data in the second cache line, at memory location [a, #64], has been read out of iteration order, by a later load. At this point the cache signals a DTX abort to the processor 4. The processor 4 takes the necessary action to rollback architectural state, and the caches clean up speculative modifications, and clear the alias bits. At this point the processor 4 can retry using scalar code, or by reducing the partition size (the number of vector elements processed in a given iteration of the vector loop), in order to ensure progress is made. In the absence of a DTX abort (or other forms of transaction aborts) the code safely publishes the speculative memory modifications. This can be achieved with a transaction end (tcommit) instruction marking the end of the transaction.

In summary, the programmer can define a transaction start event and a transaction end event to bound sequences of vector instructions for which inter-lane hazards may be possible, and between the start and end of the transaction, hazard detection circuitry 50 provided within the apparatus 2 as shown in FIG. 1 may track the addresses which are accessed by load and store instructions and abort the processing of the transaction if an inter-lane hazard is detected between elements at different element positions within a vector load instruction and a subsequent vector store. Hazard tracking storage 52 may be provided to store the tracking data for tracking the accessed addresses. The hazard tracking storage 52 is shown in dotted lines in FIG. 1 because, although it may be provided as an independent data structure, in other examples the hazard tracking data may be stored within part of the data store itself such as within the L1 data cache 28. In some cases the hazard detection circuitry 15 may also be provided within part of the control circuitry for controlling the load and store operations, such as within a load/store unit 26 or within a cache controller associated with the cache 28.

The following flow diagrams discussed in FIGS. 3 to 7 provide an example of handling of such dependency transactions.

Figure 3:
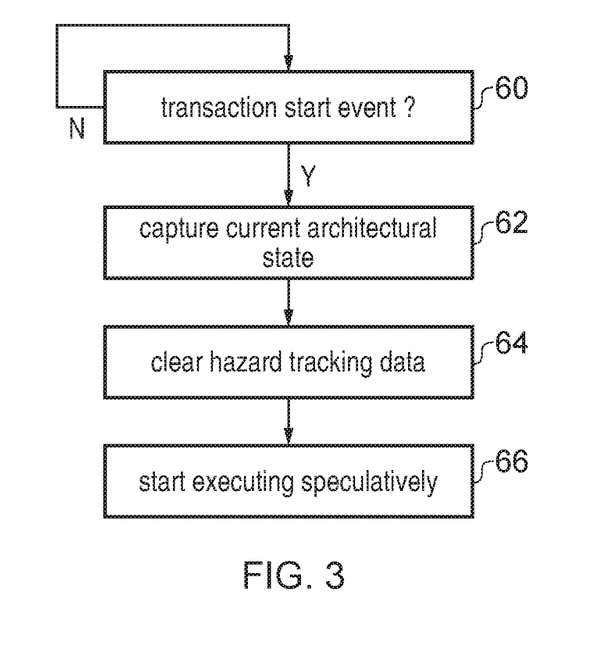
FIG. 3 is a flow diagram illustrating a method of responding to a transaction start event during execution of vectorised code.

FIG. 3 shows operations performed at the start of a transaction. At step 60 the processing circuitry 4 detects whether a transaction start event has occurred, e.g. a transaction start instruction is encountered. In response to the transaction start event, at step 62 the processing circuitry 4 captures at least a subset of current architectural state. For example the contents of at least some of the scalar registers 16 and vector registers 18 may be saved to the memory system 28, 30, 32 so that the data can be restored later if the transaction has to be aborted. Alternatively a dedicated set of restoration registers may be provided to backup the current snapshot of architectural state, to avoid needing to save it to the memory system. The current architectural state may also include other information such as the contents of control registers, e.g. a program counter indicating the current point of execution, a link register specifying a return address to which processing is to be returned following handling of an exception, or other information representing the current state of the processor.

At step 64, the hazard tracking data in the hazard tracking storage 52 is cleared. For example, the tracking hazard data is updated so that it no longer indicates any addresses as being previously accessed by a vector load instruction within the current transaction. At steps 66, processing of the current thread of execution continues speculatively, so that the results of the subsequently executed instructions are not yet committed to state. In the case of ALU, floating point, load instructions or other types of instructions which update values in the scalar or vector registers, these may simply be executed as usual to update the target registers, and this is being done speculatively in the sense that the results of such instructions can still be rewound using the previously captured snapshot of the architectural state. For store operations for writing data to the memory system, the values to be written to memory may be buffered either within the load store unit 26 or within a structure within the cache 28, 30 or memory 32 to prevent the memory actually being updated while the results are still speculative. Processing of the transaction then continues until one of the events represented in FIGS. 4 to 7 occurs.

Figure 4:
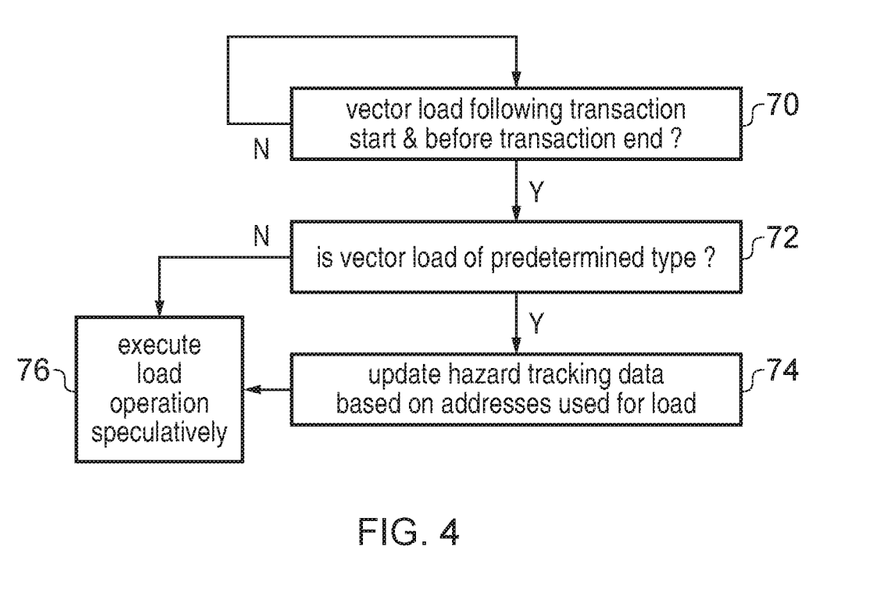
FIG. 4 is a flow diagram showing a method of updating hazard tracking data in response to a vector load instruction.

FIG. 4 shows processing of a vector load instruction encountered following a transaction start event and before the transaction end event. When such a vector load instruction is detected at step 70, at step 72 it is detected whether the load instruction is of a predetermined type. The predetermined type of vector load may for example be a vector load with a particular opcode, or a vector load specifying a control parameter which identifies that it is of the predetermined type, or could be detected based on whether a modifying instruction was executed immediately preceding the vector load to provide a hint that this is the predetermined type of instruction. When the predetermined type of instruction is detected, then at step 74 the hazard detection circuitry 50 updates the hazard tracking data in the hazard tracking storage 52 based on the addresses used for the respective elements of the vector load instruction. At step 76, the vector load instruction is then executed speculatively. On the other hand, if the vector load is not of the predetermined type then the method proceeds from step 72 direct to step 76, omitting the step of updating the hazard tracking data at step 74.

In other embodiments, step 72 may be omitted and instead the hazard tracking data could be updated at step 74 for all types of vector load. However, restricting the updating of the hazard tracking data to a particular type of load can be useful for reducing the overhead of the hazard tracking and the chances of hazards being detected. In a system which supports marking vector loads as a predetermined type for which hazards are to be tracked, the programmer can then restrict use of the predetermined type to those cases when hazards are expected so as to avoid the overhead of hazard tracking for loads where it is known that they will not generate inter-element address hazards.

Figure 5:
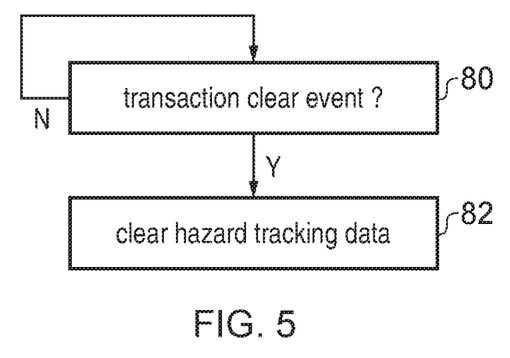
FIG. 5 is a flow diagram showing a method of responding to a transaction clear event to clear the hazard tracking data.

As shown in FIG. 5, during processing of the transaction, the processing circuitry 4 or the hazard detection circuitry 50 may detect whether a transaction clear event has occurred (step 80 of FIG. 5). If the transaction clear event occurs then at step 82 the hazard tracking data in the hazard tracking storage 52 is cleared in the same way as at step 64. This provides a mechanism for clearing the tracking data even though the end of the transaction has not yet been reached. This is useful because it allows multiple iterations of the loop to be executed within a single transaction to reduce the overhead of the transaction handling. The transaction clear event could be any event which signals that it is safe to clear the hazard tracking data, such as an exception, or an instruction which sets the control register. However, one particularly useful way of representing the transaction clear event is to provide a transaction clearing instruction (tclear) which is dedicated to clearing the tracking data. The programmer or the compiler can then use the transaction clear instruction within the sequence of vector instructions, for clearing the tracking data each time a vector's worth of data has been processed according to the corresponding iterations of the loop being vectorised.

Figure 6:
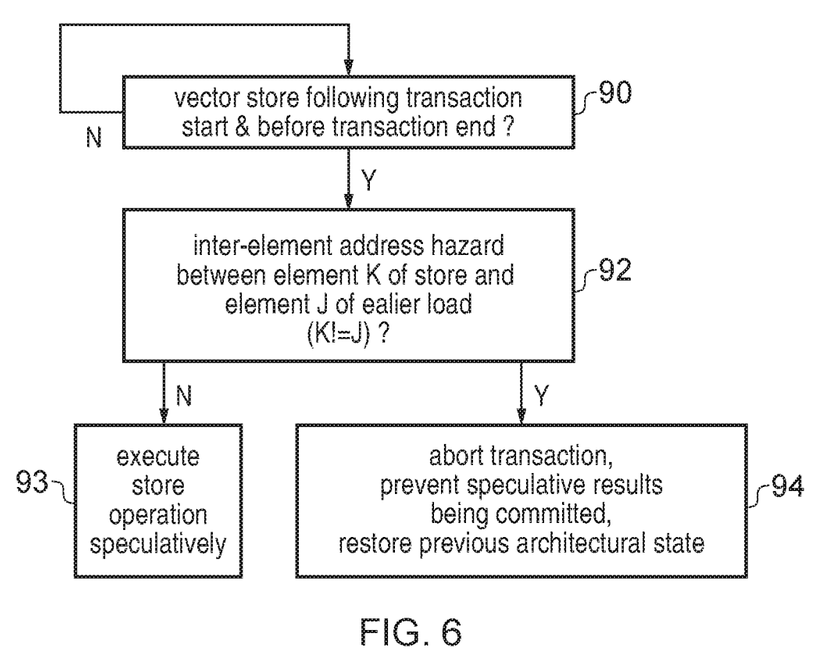
FIG. 6 is a flow diagram showing a method of detecting an inter-element address hazard.

FIG. 6 shows the hazard detection operations performed when a vector store instruction is encountered following a transaction start event and before the transaction end event. When such an instruction is detected at step 90, then at step 92 the hazard detection circuitry 50 detects whether there is an inter-element address hazard between element K of the vector store instruction and element J of an earlier load instruction where K is not equal to J. In some cases the hazards may be restricted to hazards where K is less than J. Note that both the earlier load and the subsequent store are within the same thread of instructions being executed by the processing circuitry 4. If no address hazard is detected at step 92 then at step 93 the store operation is executed speculatively as normal.

If a hazard is detected then at step 94 the hazard detection circuitry 50 triggers the processing circuitry 4 to abort further processing of the instructions within the transaction, and to prevent the speculative results generated by the already executed instructions within a transaction being committed. This can be done by discarding the speculatively buffered write data within the memory system. Also, the previously captured architectural state is restored to registers 16, 18 to rewind the processor to the state in which it was operating before the transaction started. Hence, the effects of the speculatively executed instructions are reversed.

Once the transaction has been aborted this can be signalled to the processor 4, for example through use of an exception. An exception handler can then take necessary action to ensure forward progress. For example, the equivalent processing operations could be retried using scalar code, or the vector length can be reduced (e.g. processing the required operations in groups of N/2 data elements instead of N elements can reduce the chance of an inter-element address hazard because accesses to the same memory location might be such that writes are performed in one part of the vector while reads are performed in the other part), in order to ensure that forward progress is made. Nevertheless, as the address hazards are rare, the cost of occasionally aborting some transactions is not significant in comparison with the performance improvement which can be achieved by enabling multiple iterations of a scalar loop to be processed as vectorised code.

Figure 7:
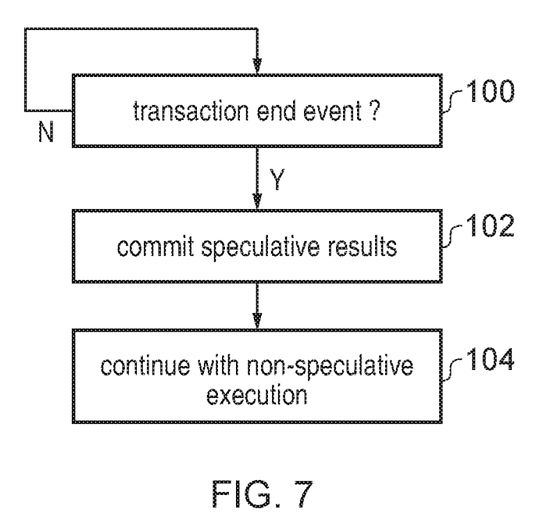
FIG. 7 is a flow diagram showing a method of responding to a transaction end event.

FIG. 7 shows the actions performed when the transaction end event at the end of a transaction is reached. In response to the transaction end event detected at step 100, at step 102 the processor 4 commits any speculatively generated results of the instructions executed since the start of the transaction. The previously captured snapshot of architectural state can be discarded or allowed to be overwritten. Any buffered memory writes can then be written to the actual memory storage by the cache 28, 30 or the memory 32. At step 104 subsequent instructions are executed non-speculatively without using the hazard tracking/detection mechanisms 50, 52.

Figure 8:
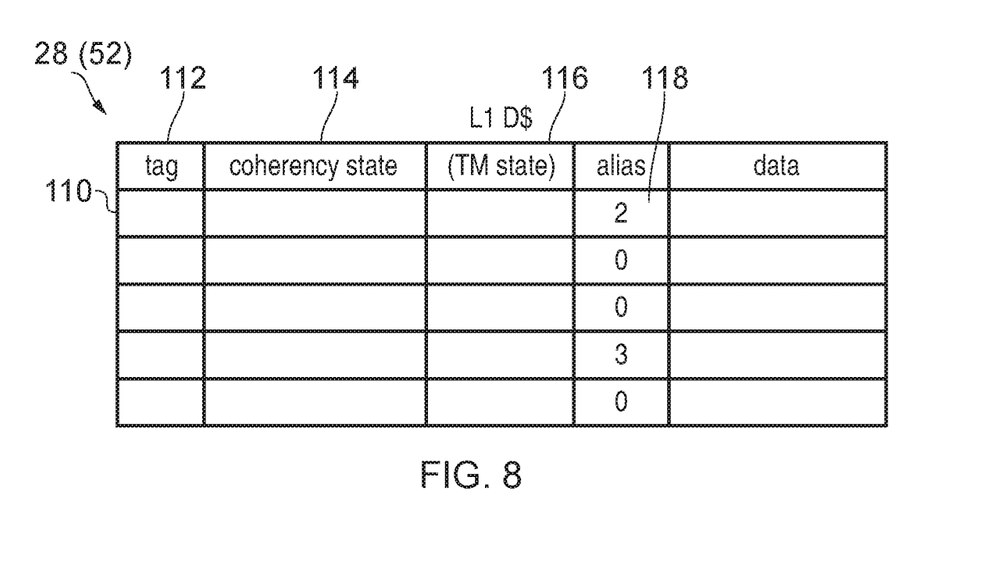
FIG. 8 shows a first example of hazard tracking data stored alongside data in a cache.

FIG. 8 shows a first example of tracking data for tracking the addresses used by load instructions (which corresponds to Example 6 shown above). In this example, the tracking entries for the hazard tracking are stored in the L1 data cache 28 alongside the corresponding data. Each cache line 110 includes a cache tag 112 identifying at least part of the address of the cached data, coherency state data indicating the coherency state of the corresponding data (e.g. whether the data is shared or unique, or whether it is clean or dirty), and other state data 116 associated with the cached data (e.g. data for transactional memory address tracking purposes). In addition, each cache line 110 stores an alias value 118 which specifies the highest data element position for which an earlier vector load instruction executed since the start of the transaction has accessed data from the corresponding cache line. Hence, when a given load is encountered then the cache lines including the data accessed for each element are updated to set the alias bits 118 for that cache line to indicate the element from which that data was accessed if that element is higher than the element position previously indicated by the alias bit 118. When a subsequent store instruction is encountered, then if the data is written to a cache line for which the alias bits indicate a higher data element position than the current data element for which the write is being performed, then a hazard is detected and this can trigger abort of the transaction. While FIG. 8 shows an example where the alias bits are provided per cache line, this may results in some false positive detections of hazards where a hazard is flagged even though the earlier load actually accessed a different part of the cache line compared to the subsequent store. The number of false positive hazards can be reduced by annotating the cache line at a finer granularity, for example with multiple alias fields 118 for different portions of the cache line. However there is a trade off between the additional circuitry for storing and updating and comparing the alias fields against the performance improvement achieved.

Figure 9:
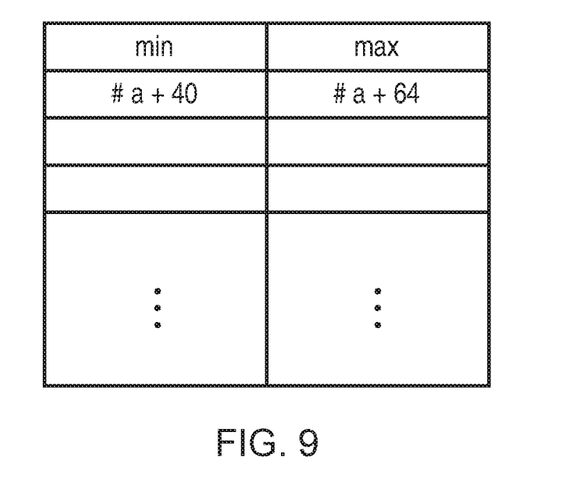
FIG. 9 shows a second example of hazard tracking data in which the minimum and maximum addresses accessed by contiguous load instructions are tracked in a storage structure.

FIG. 9 shows another example for the hazard tracking storage 52. Instead of adding alias bits to the cache, the hazard detection logic could be added to other structures such as a load/store queue, store buffer, etc., or a distinct structure could be introduced. When a contiguous vector load is encountered, this structure (or buffer) may record the maximum and the minumum address accessed {MaxAddr, MinAddr}, and when a subsequent store arrives, the lowest address of the store, *A, is checked against the entries. If the condition (MinAddr<A<=MaxAddr) holds then a conflict is detected and an abort is triggered.

Figure 10:
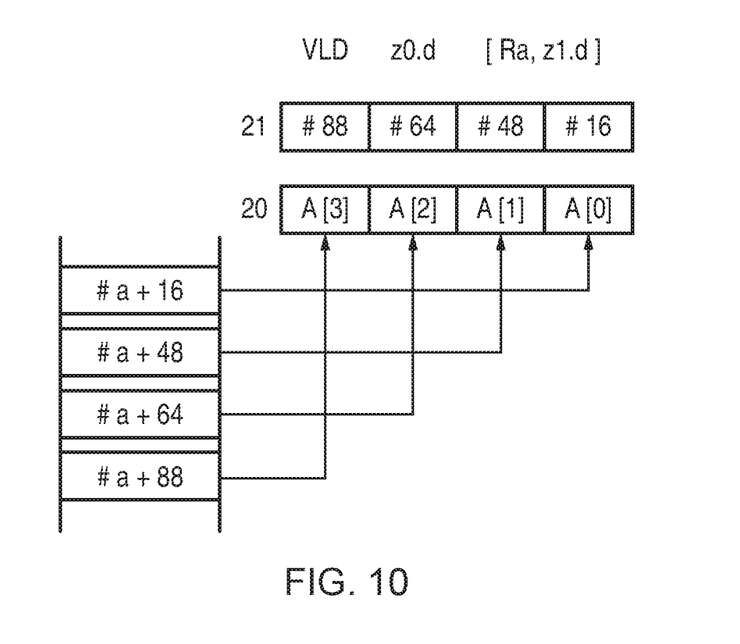
FIG. 10 shows an example of a non-contiguous (or gather) vector load instruction.
Figure 11:
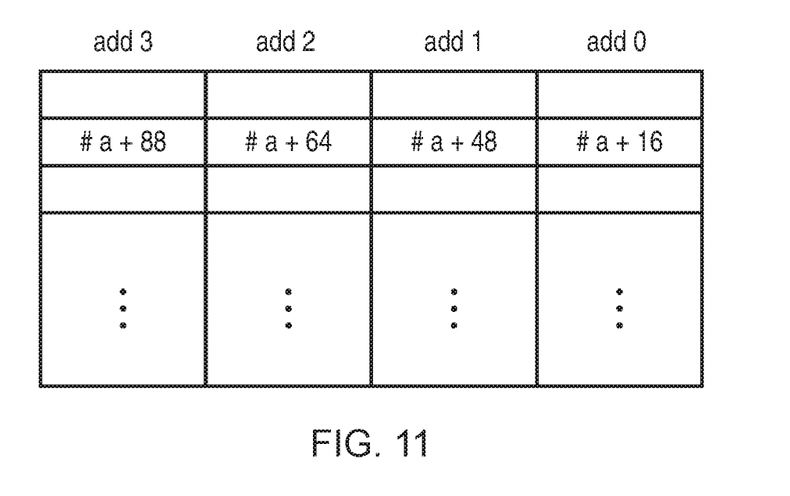
FIG. 11 shows a third example of hazard tracking data.

As shown in FIG. 10 another type of load may use addresses for each of the elements which are not consecutive. This may be referred to as a non-contiguous (or gather) load. Similarly, a non-contiguous vector store instruction may store the data values from respective elements of a vector to memory locations having non-consecutive addresses. The addresses for each element may be derived from a second vector operand Z1 which specifies different address offsets for each of the input elements for example. For a non-contiguous load/store instruction the approach shown in FIG. 8 still works, but as an alternative to FIG. 9, the approach shown in FIG. 11 can be used where the buffer stores the actual addresses used for each element, rather than the maximum/minimum addresses. The addresses are stored in correspondence with the data element position from which those addresses were accessed (e.g. in the example of FIG. 11 the addresses in column n of the tracking structure were accessed from data element n of an earlier load). For a subsequent store instruction, the hazard checking circuitry 50 can then check the set of addresses used by the store against the contents of the buffer to identify conflicts where a given element of the store accesses the same address as an address used by a higher element for an earlier load.

In some cases the programmer or compiler may introduce nested transactions where after starting one transaction, another transaction start event is detected before the end of the first transaction. Some hardware implementations may support such nested transactions to maintain multiple snapshots of the architectural state, so that if the inner transaction aborts the state is only restored to the start point of that inner transaction, rather than rewinding to the beginning of the outer transaction. However, the additional circuit overhead required for supporting nested transactions may not always be justified and some simpler implementations may simply rewind the processor state to the start of the outer transaction when an abort of an inner transaction is detected. Hence, some implementations effectively roll nested transactions into a single larger transaction.

The hazard detection circuitry 50 detects inter-lane address hazards introduced into a given thread of execution as an artefact of vectorising a scalar loop into a sequence of vector instructions. It does not need to detect other types of address hazards, such as write-after-read or write-after-write hazards between independent threads of program execution, for which other mechanisms may already be provided within the processing apparatus 2. For example, some systems may already have hardware transactional memory support, for managing conflicts between different threads of processing being performed in a multi-processor system. Where independent threads of processing are being performed in parallel using separate execution units, there is a risk than one execution unit could read or write a given address while another execution unit is also accessing the same address, leading to hazards. Hardware transactional memory techniques may use speculative processing to improve performance when detecting such hazards, by allowing operations to proceed speculatively assuming there is no conflict and then aborting a transaction and rewinding processing to an earlier point of execution when a conflict is detected. If processing reaches the end of the transaction without a conflict then the speculative results can be committed. The dependency transactions of the form described herein may be supported using at least some of the circuitry already provided for handling transactional memory transactions for dealing with conflicts between different processing elements. For example, some of the circuitry for capturing a snapshot of architectural state, or for buffering writes to the memory system, may be reused. However, unlike transactional memory techniques, the hazard detection circuitry 50 and hazard tracking storage 52 used for detecting inter-element hazards may be different and the hazards being detected may be within a single thread of program execution rather than between independent threads, where one would not ordinarily expect hazards to occur.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

The invention claimed is:

1. An apparatus comprising:
  processing circuitry to perform data processing in response to instructions, wherein in response to a vector load instruction, the processing circuitry is configured to load respective data elements of a vector value with data from respective locations of a data store, and in response to a vector store instruction, the processing circuitry is configured to store data from respective data elements of a vector value to respective locations of the data store;
  wherein the processing circuitry is responsive to a transaction start event to speculatively execute one or more subsequent instructions, and responsive to a transaction end event to commit speculative results of the one or more subsequent instructions speculatively executed following the transaction start event;
  the apparatus comprises hazard detection circuitry to detect whether an inter-element address hazard occurs between an address corresponding to data element J for an earlier vector load instruction speculatively executed following the transaction start event and an address corresponding to data element K for a later vector store instruction speculatively executed following the transaction start event, where K is different to J, and both the earlier vector load instruction and the later vector store instruction are from the same thread of instructions processed by the processing circuitry;
  wherein in response to detecting the inter-element address hazard, the hazard detection circuitry is configured to trigger the processing circuitry to abort further processing of the instructions subsequent to the transaction start event and prevent said speculative results being committed; and
  the apparatus comprising hazard tracking storage circuitry to store hazard tracking data for tracking addresses used for one or more earlier vector load instructions speculatively executed following the transaction start event.

2. The apparatus according to claim 1, wherein in response to detecting the inter-element address hazard, the hazard detection circuitry is configured to trigger the processing circuitry to restore architectural state data to a previous version of the architectural state data captured in response to the transaction start event.

3. The apparatus according to claim 1, wherein K<J.

4. The apparatus according to claim 1, wherein the hazard tracking storage circuitry comprises part of said data store.

5. The apparatus according to claim 1, wherein the hazard detection circuitry is configured to clear the hazard tracking data in response to the transaction start event.

6. The apparatus according to claim 1, wherein the hazard detection circuitry is configured to clear the hazard tracking data in response to a transaction clear instruction executed following the transaction start event.

7. The apparatus according to claim 1, wherein the hazard detection circuitry is responsive to a vector load instruction speculatively executed following the transaction start event to update the hazard tracking data based on the addresses used for that vector load instruction.

8. The apparatus according to claim 7, wherein the hazard detection circuitry is configured to update the hazard tracking data in response to a predetermined type of vector load instruction, and to suppress the update of the hazard tracking data in response to a vector load instruction other than said predetermined type of vector load instruction.

9. The apparatus according to claim 1, wherein the hazard tracking data comprises a plurality of tracking entries each corresponding to a respective block of addresses and identifying a highest data element position at which an address within the corresponding block of addresses was used for an earlier vector load instruction speculatively executed following the transaction start event.

10. The apparatus according to claim 9, wherein the hazard detection circuitry is configured to detect the inter-element address hazard for the later vector store instruction speculatively executed following the transaction start event when the tracking entry corresponding to a block of addresses including an address used for a given data element position of the later vector store instruction identifies a higher data element position than said given data element position.

11. The apparatus according to claim 9, wherein said data store comprises a cache comprising a plurality of cache lines for storing data, and the tracking entries are stored in the cache, each cache line being associated with one or more of the tracking entries for one or more blocks of addresses corresponding to that cache line.

12. The apparatus according to claim 11, wherein in response to eviction of a cache line from the cache associated with a tracking entry indicating that at least one address of the corresponding block of addresses was used for an earlier vector load instruction speculatively executed following the transaction start event, the hazard detection circuitry is configured to trigger the processing circuitry to abort further processing of the instructions subsequent to the transaction start event and prevent said speculative results being committed.

13. The apparatus according to claim 1, wherein the hazard tracking data comprises one or more load tracking entries each identifying at least one of a minimum address and a maximum address accessed for a corresponding vector load instruction speculatively executed following the transaction start event.

14. The apparatus according to claim 13, wherein the hazard detection circuitry is configured to detect the inter-element address hazard when a minimum address for a later vector store instruction speculatively executed following the transaction start event is greater than the minimum address and less than or equal to the maximum address indicated by one of the load tracking entries.

15. The apparatus according to claim 1, wherein the hazard tracking data comprises an address list identifying one or more addresses accessed for respective data elements of one or more vector load instructions speculatively executed following the transaction start event.

16. The apparatus according to claim 15, wherein the hazard detection circuitry is configured to detect the inter-element address hazard when an address corresponding to a given data element position for the later vector store instruction is the same as an address corresponding to a data element position other than said given data element position for an earlier vector load instruction speculatively executed following the transaction start event.

17. The apparatus according to claim 1, wherein the transaction start event comprises a transaction start instruction and the transaction end event comprises a transaction end instruction.

18. A data processing method comprising:
- in response to a transaction start event, speculatively executing one or more subsequent instructions;
- in response to a vector load instruction, loading respective data elements of a vector value with data from respective locations of a data store;
- in response to a vector store instruction for storing data from respective data elements of a vector value to respective locations of the data store, detecting whether an inter-element address hazard occurs between an address corresponding to data element J for the vector load instruction and an address corresponding to data element K for the store instruction, where K is different to J, and both the earlier vector load instruction and the later vector store instruction are from the same thread of instructions;
- in response to detecting the inter-element address hazard, aborting further processing of the one or more subsequent instructions and preventing speculative results of the one or more subsequent instructions being committed;
- in response to a transaction end event, committing the speculative results of the one or more subsequent instructions; and
- storing hazard tracking data for tracking addresses used for one or more earlier vector load instructions speculatively executed following the transaction start event.

19. An apparatus comprising:
- processing circuitry to perform data processing in response to instructions, wherein in response to a vector load instruction, the processing circuitry is configured to load respective data elements of a vector value with data from respective locations of a data store, and in response to a vector store instruction, the processing circuitry is configured to store data from respective data elements of a vector value to respective locations of the data store;
- wherein the processing circuitry is responsive to a transaction start event to speculatively execute one or more subsequent instructions, and responsive to a transaction end event to commit speculative results of the one or more subsequent instructions speculatively executed following the transaction start event;
- the apparatus comprises hazard detection circuitry to detect whether an inter-element address hazard occurs between an address corresponding to data element J for an earlier vector load instruction speculatively executed following the transaction start event and an address corresponding to data element K for a later vector store instruction speculatively executed following the transaction start event, where K is different to J, and both the earlier vector load instruction and the later vector store instruction are from the same thread of instructions processed by the processing circuitry;
- wherein in response to detecting the inter-element address hazard, the hazard detection circuitry is configured to trigger the processing circuitry to abort further processing of the instructions subsequent to the transaction start event and prevent said speculative results being committed, and
- in response to detecting the inter-element address hazard, the hazard detection circuitry is configured to trigger the processing circuitry to restore architectural state data to a previous version of the architectural state data captured in response to the transaction start event.

* * * * *